Aug. 4, 1964    W. T. CASKIE    3,143,222
PALLETIZING MACHINE
Filed Aug. 31, 1961    9 Sheets-Sheet 3

INVENTOR
WILLIAM T. CASKIE,

Wm. P. Spielman
ATTORNEY

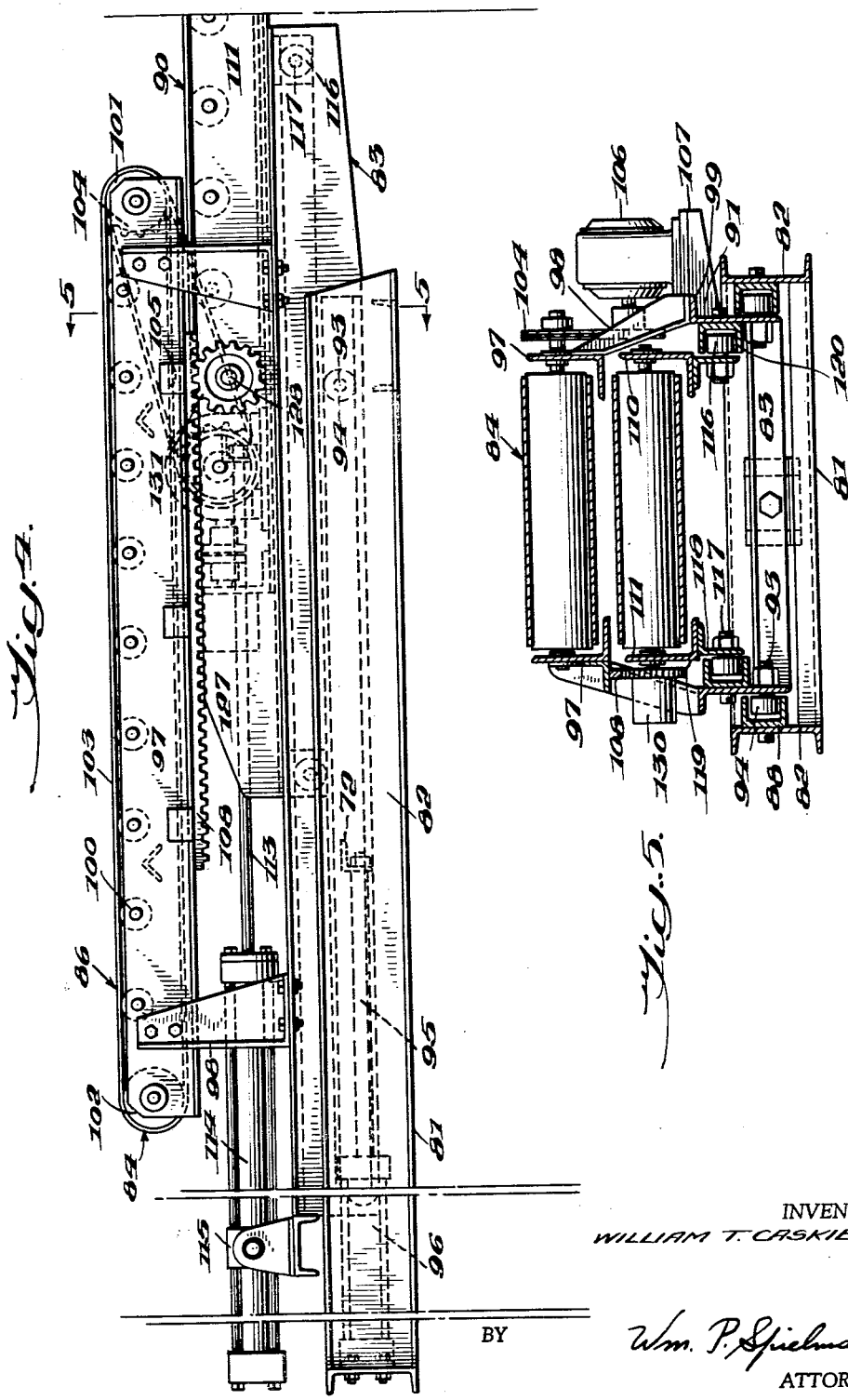

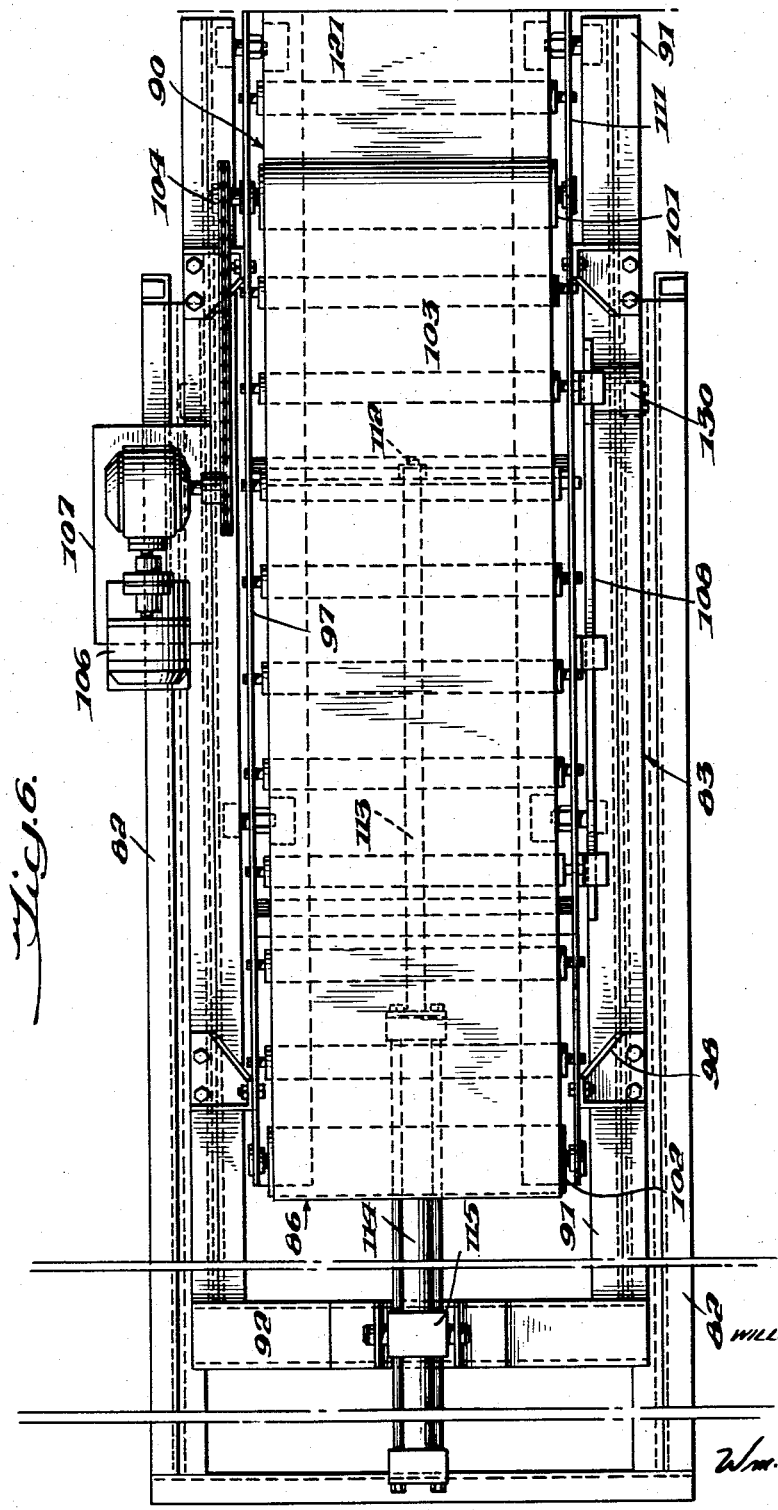

INVENTOR
WILLIAM T. CASKIE,
BY Wm. P. Spielman
ATTORNEY

Aug. 4, 1964　　　W. T. CASKIE　　　3,143,222
PALLETIZING MACHINE

Filed Aug. 31, 1961　　　　　　　9 Sheets-Sheet 7

INVENTOR
WILLIAM T. CASKIE,

BY  Wm. P. Spielman
ATTORNEY

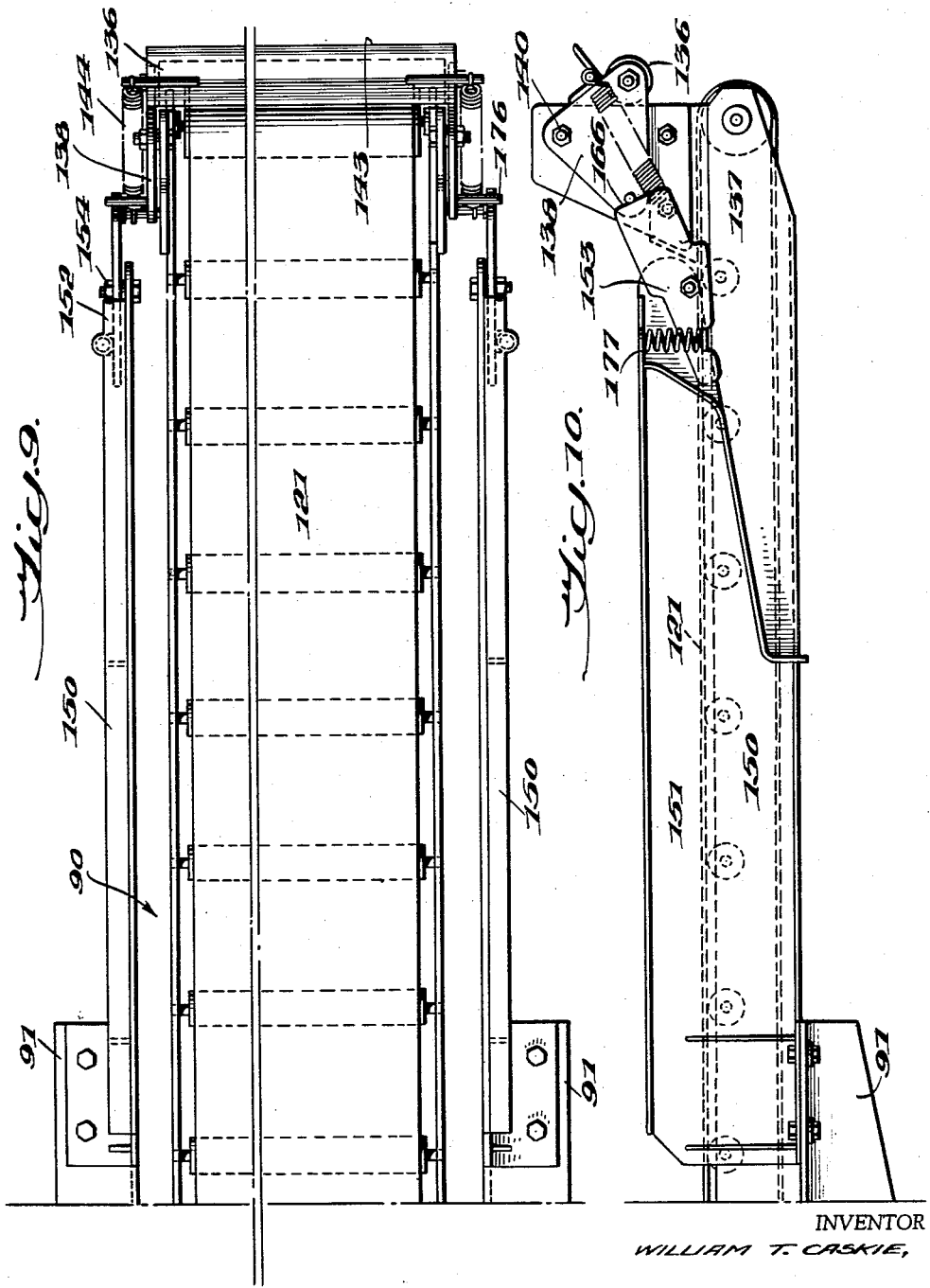

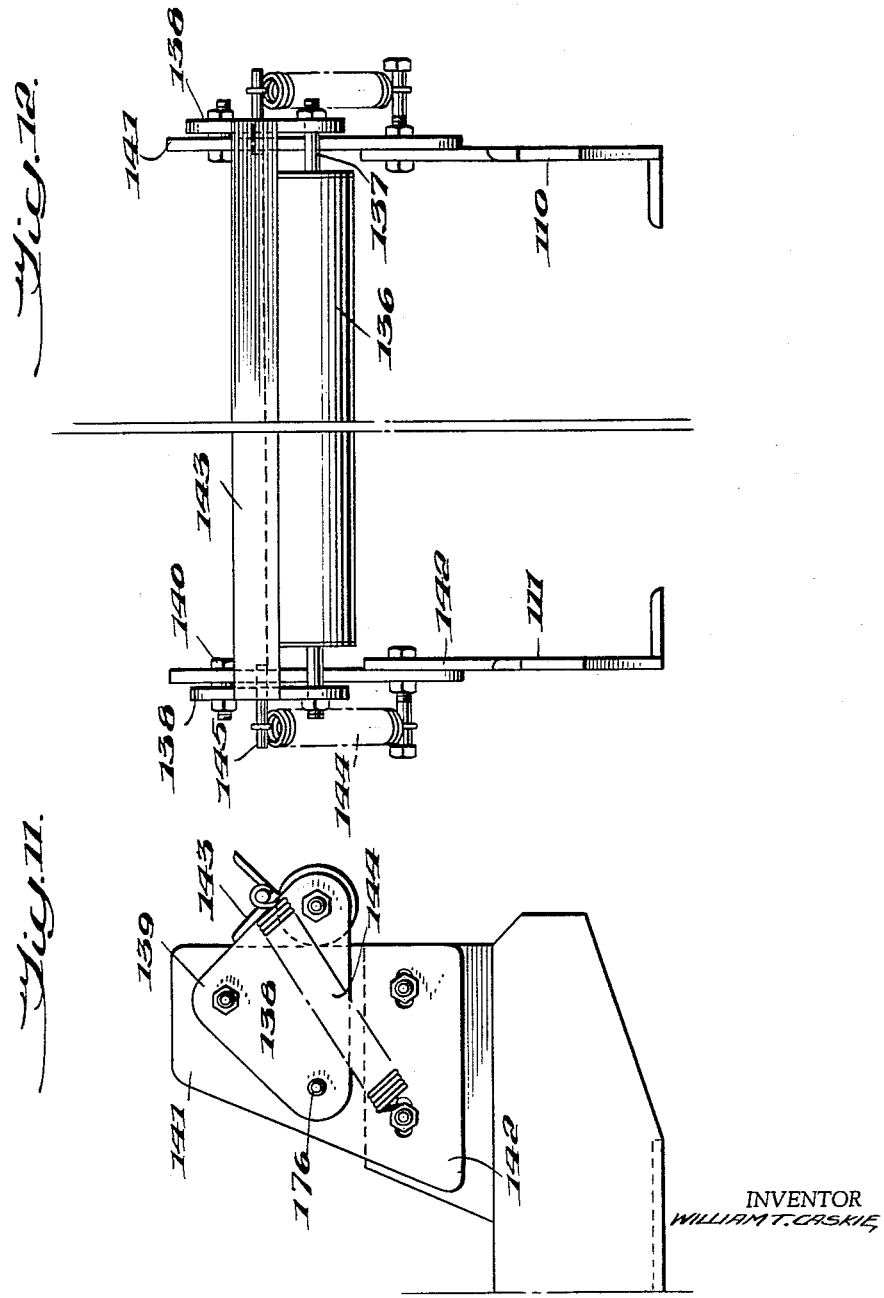

United States Patent Office 3,143,222
Patented Aug. 4, 1964

3,143,222
PALLETIZING MACHINE
William T. Caskie, Eatontown, N.J., assignor to American Cyanamid Company, New York, N.Y., a corporation of Maine
Filed Aug. 31, 1961, Ser. No. 135,277
10 Claims. (Cl. 214—6)

This invention relates to machines for loading pallets, which are movable platforms that are in wide commercial use for transporting objects from one place to another and also for stacking operations. In particular, the invention relates to machines of this type adapted particularly for loading packages such as filled bags on pallets in a series of layers or tiers, and preferably in an interlocking arrangement wherein a bag of one tier overlies parts of two or more bags in the next lower tier so as to make a more stable pile.

Within recent years machinery for palletizing boxes, cartons and other rectangular solids has been brought to a high degree of efficiency. Such machines, however, are not equally well suited for loading filled bags since they usually employ a ram or other pushing means for sliding the objects onto the pallet. My experiments have shown that this type of treatment often ruptures filled paper bags and also distorts the shape of these and other bags to such an extent that it is sometimes difficult to secure a stable pile.

It is therefore a principal object of my present invention to provide a palletizing machine which, while it can be used to load packages generally on pallets, is especially designed to handle loaded bags with a minimum of tearing or rupturing of the bags or distortion of their shapes. This object includes the provision of a pallet loader wherein a package-carrying belt supported on a movable carriage is reciprocated to and away from the pallet being loaded and is made to move forwardly as the carriage moves back and so hold the package relatively motionless over the pallet as the carriage is withdrawn from beneath it. The provision of a package positioner cooperating with this belt to produce a more even arrangement of bags on the pallet is also included as an object of the invention.

A further principal object of my invention is to provide a palletizing machine in which a pattern shifter is combined with a package placer or loader so that the machine will load a pallet with successive layers or tiers of bags or other packages in overlapping relation, thereby producing a more stable pile. Another object is to provide novel mechanisms for carrying out the package placing and pattern shifting functions that are simple in construction, reliable in performance, and adapted for high speed operation.

An additional object of the invention is to provide a palletizing machine containing an improved pallet handling unit that is so designed and operated as to cooperate with reciprocating pallet loading and pattern shifting mechanisms to permit fully automatic operation including the automatic advancing of an empty pallet to an elevating turntable, its automatic positioning, rotating and lowering at a loading station wherein it receives packages from a reciprocating package placer and its automatic delivery when fully loaded to a pallet discharge station. This object in a more specific aspect includes the provision of a bag-controlled type of automation; i.e. a palletizing machine in which some or all of the operating units are actuated by the movement of the bags or other packages being loaded or by the movement of their supports. This produces a palletizer which works automatically even with uneven arrival of the bags.

A still further object is to provide an automatically operated palletizer wherein some or all of the various operating parts are designed for actuation by hydraulic or pneumatic fluid drive means and are so driven, thus permitting smooth starts and stops under full loads even during rapid operation. Additional objects of the invention will in part be pointed out hereinafter or will become evident from the following detailed description of a preferred embodiment of the invention when taken with the appended claims.

The invention will be further described in detail with reference to the accompanying drawings, which show a complete operative embodiment thereof. Referring to these drawings:

FIG. 4 is a side elevation of the bag loader assembly.

FIG. 5 is a section on the line 5—5 of FIG. 4.

FIG. 6 is a plan view of the bag loader assembly of FIG. 4.

FIG. 9 is a plan view of the outer end of the bag loader assembly of FIG. 6 showing the attachment of a package positioner thereto.

FIG. 10 is a side elevation of FIG. 9.

FIG. 11 is an enlarged detail of the toggle and roller shown in FIG. 10, and

FIG. 12 is a front view of the side pieces of the reciprocating carriage showing the attachment of the package positioner thereto.

Figure 1:
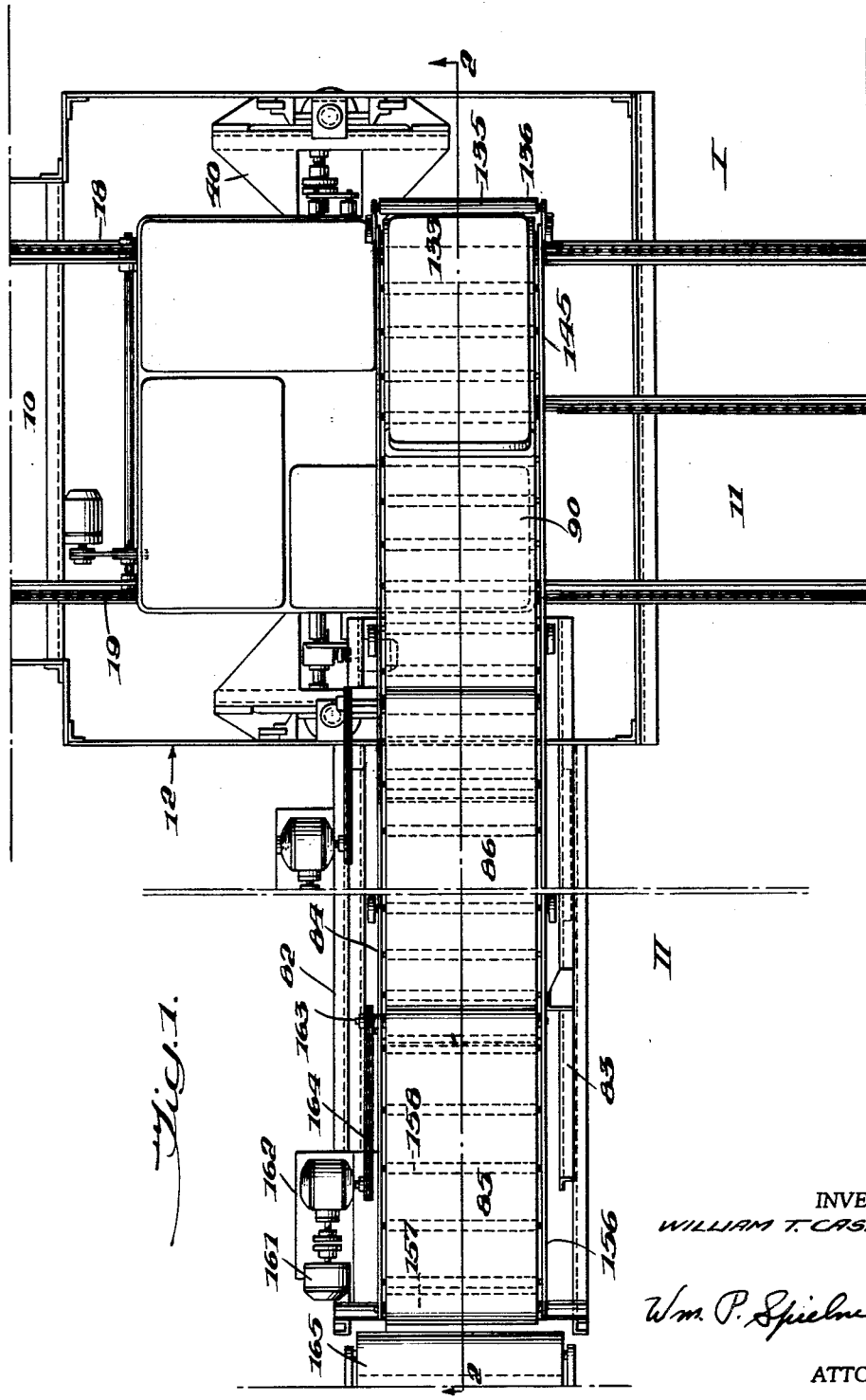
FIG. 1 is a plan view of a bag palletizer embodying the principles of the invention.

Referring to these drawings, the palletizer shown generally in FIG. 1 is made up of a lower pallet handling unit I and an upper package placing unit II. The pallet handling unit is shown in greater detail in FIGS. 2 and 3 while FIGS. 4, 5 and 6 show the construction and operation of the package placing unit.

The Pallet Handling Unit

The pallet handling unit is composed generally of an empty pallet dispensing section or chamber 10, a loaded pallet discharging section 11 containing a pallet runout conveyor and a pallet elevating and turning section 12. It will be understood that several empty pallet handling units are available commercially, and that the structure hereinafter described may be replaced by units of other types without departing from the broader scope of the invention.

Figure 3:
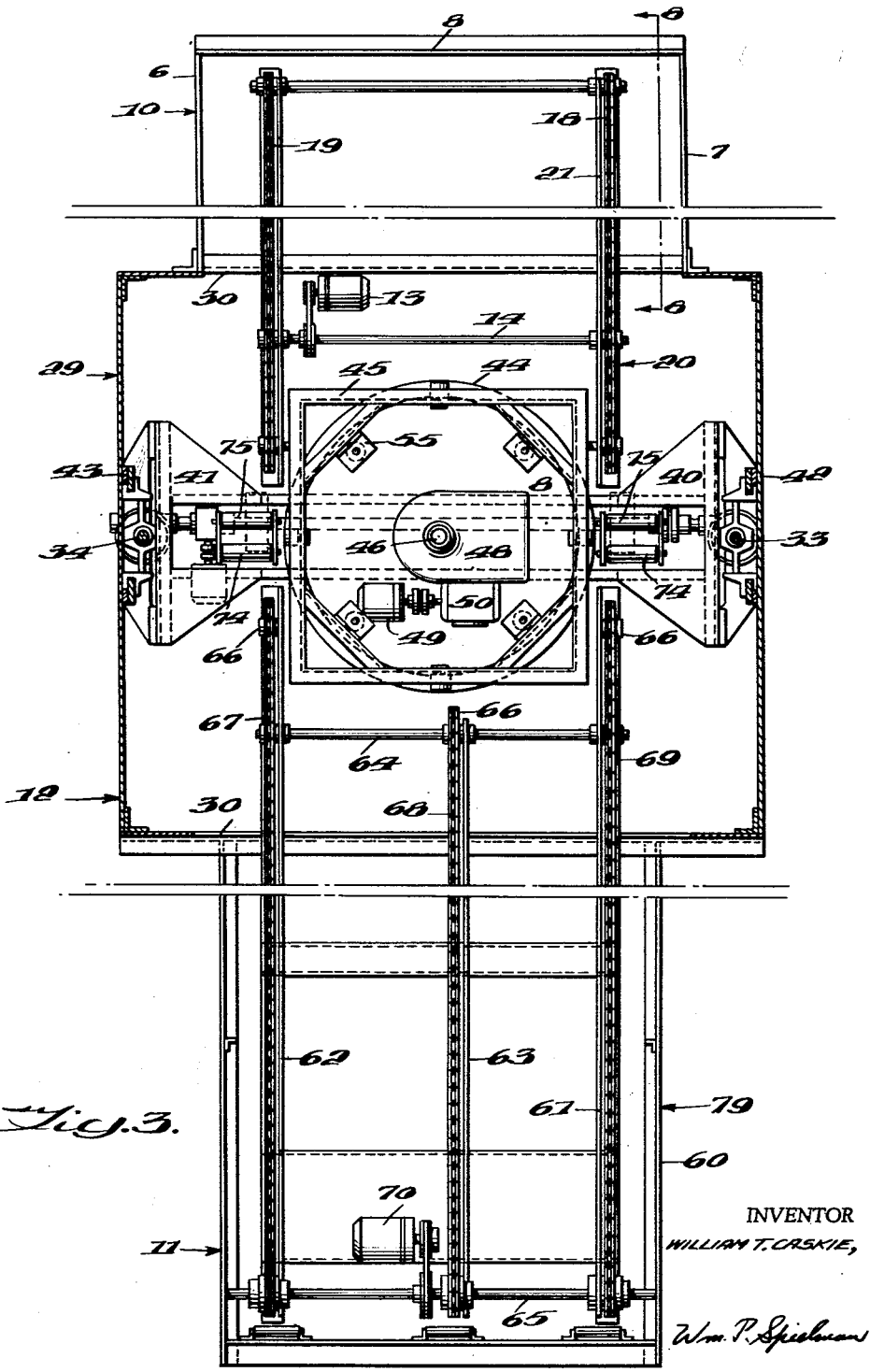
FIG. 3 is a horizontal section showing the pallet elevator, turntable, indexing unit and conveyor chains and taken on the line 3—3 of FIG. 2.
Figure 8:
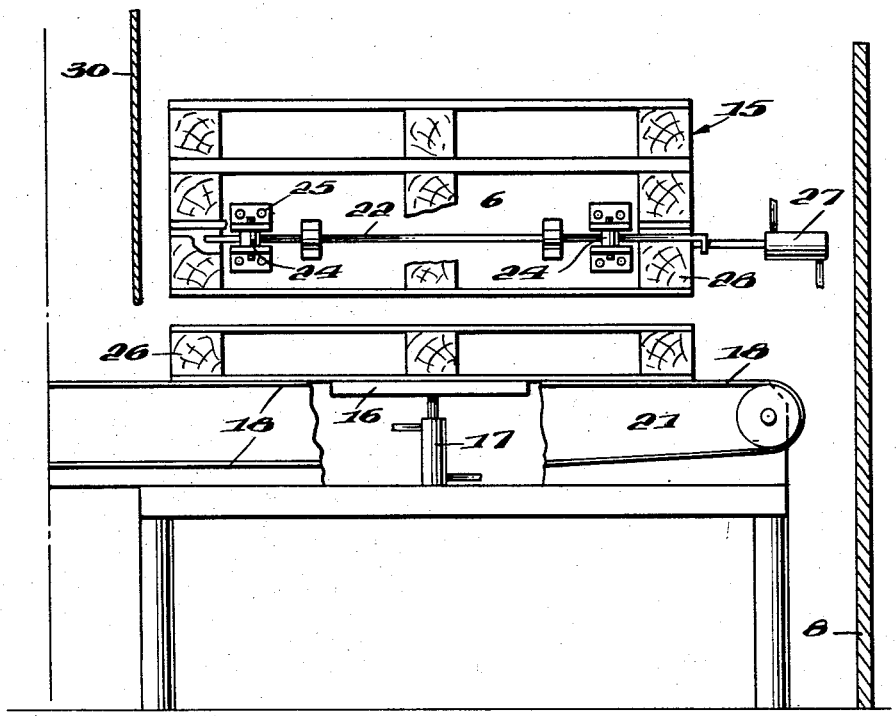
FIG. 8 is a side elevation of one form of pallet dispenser for use in the bag palletizer taken on the line 8—8 of FIG. 3 and with parts broken away.

As will be seen by reference to FIGS. 3 and 8 of the drawings, the preferred pallet dispenser is one wherein the upper pallets of a stack of pallets 15 are suspended by flippers 24 mounted on the rear and front walls 6 and 7 of the dispensing section 10 while the bottom pallet 26 is deposited on conveyor chains 18 and 19 and moved by these chains into proper position within the pallet elevating section 12 by operation of the motor 13 and drive shaft 14.

FIG. 8 is a vertical section through the chamber 10. Conveyor chain 18 and its supporting rail 21 are broken away in this figure in order to show the location between the conveyor chains of the pallet elevator 16 and its hydraulic cylinder 17. The central areas of two of the pallets 15 are also broken away in order to show the location of one of the flipper bar rods 22 and its actuating hydraulic cylinder 27. It will be understood that the other flipper bar rod is mounted at the same level in the front wall 7.

In operation, a stack of empty pallets is placed on the elevator 16 with the open ends of the pallets facing the rear and front walls 6 and 7 of the chamber 10, as shown. The power cylinder 17 is then actuated to raise the stack until the pallet 28, the second from the bottom, is opposite the flippers 24. These flippers are pivotally mounted in their supporting brackets 25 with their inner ends pivotally connected to a laterally slidable flipper bar rod 22 in such a manner that its lateral movement causes the flippers to rotate horizontally through a right angle. Operation of the two power cylinders 27 therefore causes the four flippers 24 to extend into the open ends of the pallet 28, thus suspending all of the upper pallets of the stack 15 while the bottom pallet 26 is lowered onto the conveyor chains by reversing the direction of operation of the cylinder 17.

The pallet elevating section 12 is contained in a structural steel housing 29 having one end wall 30 that terminates above the level of a pallet as shown in FIG. 8 and vertical side walls 31 and 32 carrying elevator screws 33 and 34 which are mounted in lower bearings 36 and supported by upper bearings 35. Extending across this housing is a lifting table assembly 38 which includes a lift table 39 provided with shoes 40 and 41 (shoe 41 being shown on FIG. 2 in cross section) which are geared to the elevator screws 33 and 34 and move in vertical guides 42 and 43 respectively. An annular turntable support 44 is attached centrally to the lift table 39 and is adapted to carry a pallet turntable 45 thereon. A central shaft 46 is secured at its upper end to the top 47 of this turntable. This shaft 46 is the output shaft of a four-position indexing unit 48; it is geared to a motor 49 through a set of reducing gears 50. The weight of the turntable, and of the bags 51 thereon, is carried by a set of rollers 52 mounted in depending brackets 53 and operating on a flanged upper edge of the annular support 44, while the turntable is guided in its circular path by the vertically mounted rollers 55. The construction is therefore one in which the pallet indicated in FIG. 2 by reference numeral 59 can be rotated to any desired quadrant by operating the motor 49 and can be raised or lowered to any desired vertical position by rotation of the elevator screws 33 and 34 by means of a connecting drive shaft 56 driven through reducing gears 57 by a motor 58.

The construction of the loaded pallet discharging section 11 is shown in FIG. 3 of the drawings. It is composed generally of a framework 60 which includes outer rails 61 and 62 and a center rail 63, transverse axles 64 and 65 each carrying three sprockets 66 adjacent the opposite ends of the three rails, and three roller chains 67, 68 and 69 pasing around the sprockets and having their upper flights supported by the rails. Axle 65 is driven through gearing by a motor 70.

Pairs of pallet supporting rollers 74 and 75 are provided opposite the inner ends of outer rails 61 and 62 in order to sustain the very considerable weight of a fully loaded pallet as it is transferred to the pallet runout conveyor. As is most clearly shown in FIGS. 2 and 3 these rollers are mounted on posts 76 and 77 that are welded or otherwise attached to the floor 78 of the housing 29, the rollers 74 being spring mounted and the rollers 75 being fixed. These rollers come into use when the loaded pallet is in the initial unload position.

It will be noted from FIG. 3 that most of the structure of the pallet discharging section 11 is outside the housing 29, the rails and chains extending outwardly from its open end 30 for a distance greater than the length of a pallet. This portion therefore constitutes a pallet discharge station 79 from which loaded pallets can be removed by a lift truck or onto a conveyor or any other suitable transporting means. It will thus be seen that the loaded pallet discharging section 11 receives a loaded pallet from the descending pallet turntable 45 on its rollers 74 and 75 and conveys the pallet outwardly on rails 61, 62 and 63 by the action of the roller chains thereon until the discharge station 79 has been reached.

The Package Placing Unit

Referring now to FIG. 2 and FIGS. 4–6 of the drawings, the package placing unit II is seen to consist generally of a supporting base structure 80 including an inclined runway 81 having side beams 82, a pattern shifter 83 reciprocally mounted thereon, and a package delivering assembly 84 together with actuating and control means therefor. The package delivering assembly includes an upper gate conveyor 85 and a package-placing mechanism including an intermediate accelerating conveyor 86 and a lowermost reciprocating conveyor or carriage 90 having a package-carrying belt supported thereon.

The relationship of these elements is most easily understood from FIGS. 2, 4, 5 and 6. The pattern shifter 83 is essentially a longitudinally movable framework having side pieces 91 and a transverse end piece 92, axles 93 extending outwardly adjacent the lower edges of the side pieces, and rollers 94 on the axles. It is supported on the runway 81 of the base 80, the rollers 94 moving in channels 88 which are attached to the side beams 82 thereof, and is actuated by means of a piston rod 95 attached to cross piece 72 and working in a preferably hydraulic power cylinder 96 carried by the supporting structure 80. Its function is to move the bag-placing mechanism from one side or zone of a pallet to the other, thereby arranging the tiers of bags in an interlocking pattern.

The accelerating conveyor 86 is carried by and moves with the pattern shifter, its longitudinally extending side rails 97 being bolted to brackets 98 which are attached at their lower ends to flanges 99 on the side pieces 91. It is provided with intermediate supporting rollers 100 and with front and rear end pulleys 101 and 102 over which a belt 103 is passed. Pulley 101 is driven through sprocket 104 and chain 105 by a motor 106 which is also carried by the pattern shifter, being supported on a bracket 107 attached thereto. A rack 108 is fastened to one of the side rails 97 of this conveyor for a purpose that will subsequently be explained.

The reciprocating carriage 90 receives packages from the accelerating conveyor 86 and places them in position on the pallet being loaded. Its framework is made up of two longitudinally extending parallel side pieces 110 and 111, a cross piece 112 and such additional cross braces as may be desirable to obtain rigidity. Its reciprocating motion is imparted by a drive rod 113 attached to the cross piece 112 and driven by the movement of a piston in a preferably hydraulic power cylinder 114 supported in gimbals 115 on the end piece 92 of the pattern shifter. It moves on rollers 116 the axles 117 of which are supported by brackets 118 attached to bottom flanges 119 of the side pieces 110 and 111. These rollers roll within channels 120 which are attached to the side pieces 91 of the pattern shifter adjacent the upper edges thereof.

The package placing belt 121 of the reciprocating carriage 90 is not motor driven. It remains relatively motionless during the outward thrust of the mechanism but during the return its package-carrying upper surface moves forward at a rate that is exactly equal to the reverse motion of the side pieces 110 and 111. The result is that a filled bag or other package on the belt is carried to its proper position on the pallet being loaded by the forward motion but does not move on the return since the surface of the belt 121 rolls out from under it as its conveyor carriage is withdrawn. The bag is therefore placed on the pallet without being pushed laterally over the pallet surface or the bags of a lower tier. This result is accomplished by the following arrangement of parts.

Belt 121 passes over a set of supporting rolls 122 and an outer end pulley 123, all of which are free to rotate in bearings carried by the side pieces 110 and 111 of the reciprocating conveyor carriage. It also passes over a driving roll 124 which is fastened to an axle that is mounted across the side pieces 110 and 111 some distance from the inner ends 127 thereof. This axle has a laterally projecting end 128 to which an overrunning clutch 130 is attached. This clutch is similar in its construction and operation to a bicycle coaster brake and as on a bicycle its driving element carries a drive gear 131 that is meshed with the rack 108 on the frame of the accelerating conveyor. The particular clutch shown on the drawing is known commercially as a "Formsprag" overrunning clutch.

When the carriage 90 is moving forward the internal faces of the clutch 130 are out of contact and the belt 121 is not driven. When the carriage moves in the opposite direction, however, the clutch faces come together and the motion of the pinion 131 causes a clockwise rotation of driving roll 124; this drives the upper span 132 of belt 121 in the opposite direction and produces the action on a bag 133 thereon that is described above.

In order to obtain a more even stacking of the bags on the pallet a bag positioner 135 is preferably provided. Its principal operating elements are a roller 136 extending across the outer end 137 of the reciprocating carriage and acting in its lowered position as a package stop and also as a bag flattener, a pair of toggles 138 which raise and lower the roller, and means for discharging the package by raising the toggles when the proper position of the carriage has been raeched.

As is shown in FIGS. 11 and 12 of the drawings the toggles 138 are triangular side plates mounted at their upper corners 139 on pivot pins 140 carried on supports 141 which are adjustably bolted to flanges 142 welded to the conveyor side pieces 110 and 111. The two toggles are joined by an angle iron 143 which is preferably attached by welding and causes them to move together. The axle of roller 136 is journalled in the forward corners of the toggles so that the roller is raised and lowered as the toggle swings on its pivots 140, and compression springs 144 attached to pins 145 tend to keep the roller in a normally lowered position in the path of a bag on the carriage 90.

While the roller 136 may be raised by any suitable means, a particularly advantageous mechanism is illustrated in FIGS. 9 and 10 of the drawings. This mechanism takes advantage of the relative movement between the reciprocating conveyor 90 and the side pieces 91 of the pattern shifter on which it is mounted.

As is shown in FIG. 9 a pair of extensions 150 are bolted or otherwise rigidly attached to the outer ends of the pattern shifter side pieces 91. If desired, these extensions 150 may be considerably higher than the upper surface of the belt 121, as shown in FIG. 10, so that their upper portions 151 form guides to keep the bags or other packages straight on conveyor carriage 90. They are recessed at their outer ends 152 to receive levers 153 which are attached thereto by pivot pins 154. The outer edges 166 of levers 153 constitute cam surfaces adapted to bear against pins 176 carried by the rear corners of toggles 138. Expansion springs 177 normally keep the outer ends of the levers in raised position but permit them to swing downwardly under the pins 176 as the carriage 90 moves outwardly.

Figure 2:
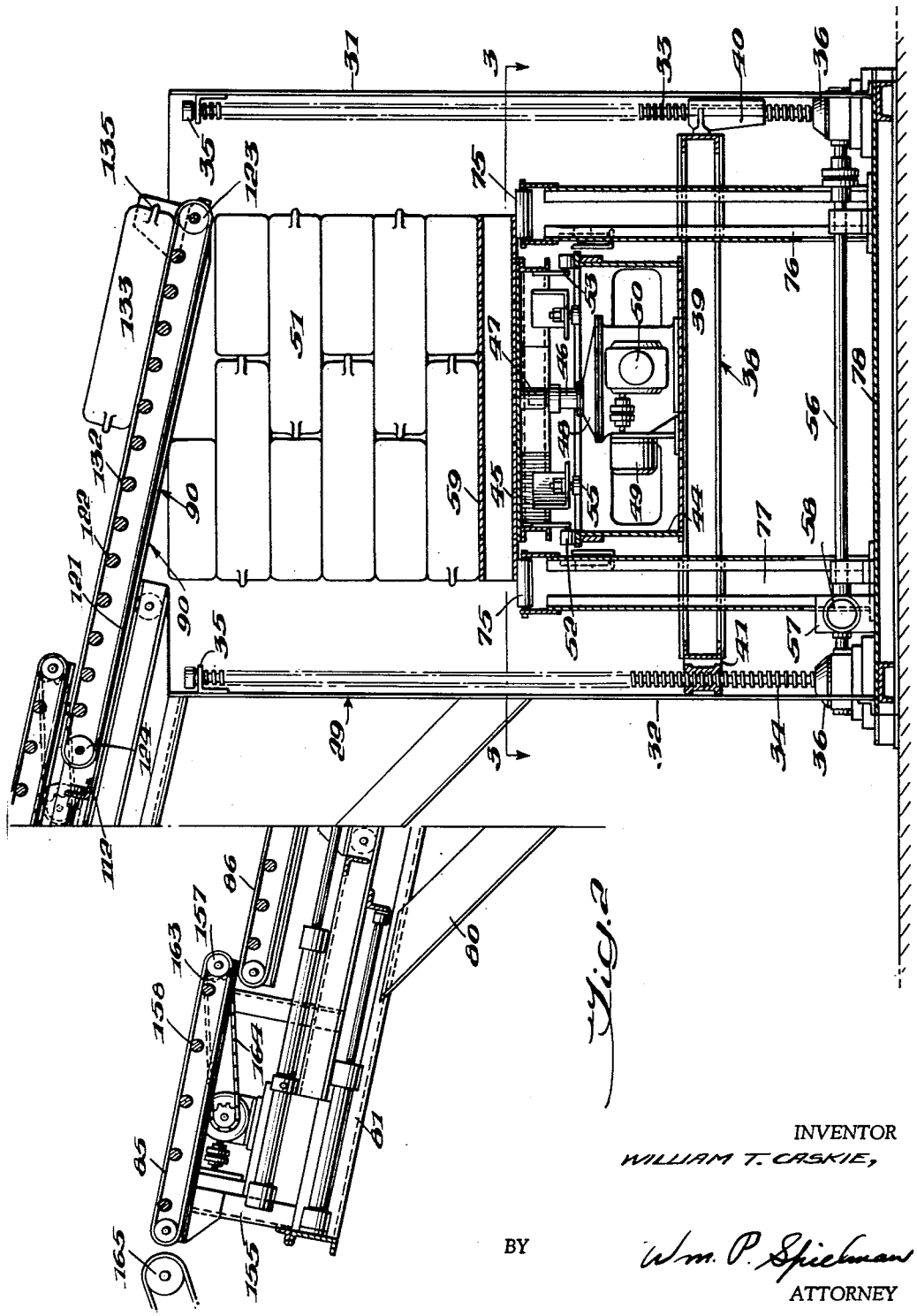
FIG. 2 is a vertical section taken on the line 2—2 of FIG. 1 in the direction of the arrows.

In operation, the roller 136 holds a filled bag or other package 133 (FIG. 2) in its proper position as the carriage 90 moves outwardly. As soon as its reverse motion begins the pins 176 contact the cam surfaces 166; upon continued inward motion of the carriage 90 the pressure of these pins on the cams causes the toggles 138 to pivot counterclockwise about pivot pins 140, thus raising the roller 136 and permitting the bag to pass under it and be deposited on the pallet by the outward motion of the upper belt surface 132. By this means the regular bag deposition and even bag spacing depicted at 51 in FIG. 2 is obtained.

The bag gate conveyor 85 differs from the other package-delivering conveyors in that it is fixed, being mounted on supports 155 that are attached to the side beams 82 of the supporting base 80. It is conventional in structure, being made up of a pair of side strips 156 in which end rollers 157 and supporting rollers 158 are journalled, a belt 159 passing over these rollers and a drive 160 including a motor 161 supported on a bracket 162 attached to the supporting structure, a sprocket 163 on the axle of the forward end roller, and chain drive 164. The purpose of this conveyor is to receive filled bags to be palletized from a suitable supplying means, such as a conveyor 165, and deliver them to the accelerating conveyor 86.

The preferred embodiment of the invention therefore provides a bag placing unit in which all of the handling is done on conveyor belts. A twofold advantage is thereby obtained; the bags are delivered to the pallet and placed thereon without pushing, turning, sliding or jarring that would rupture them or cause a radical change in shape and, as will subsequently be shown, the system is particularly well suited for automation.

*The Power and Control Systems*

As has already been indicated, the elements of the improved palletizing machine are not advantageously actuated by pressurized fluids, such as pneumatic or preferably hydraulic cylinders and motors. These have the advantage over electric motors that they can be started and stopped more readily under full loads, thus providing smooth starts and stops even under high speed operation.

Figure 7:
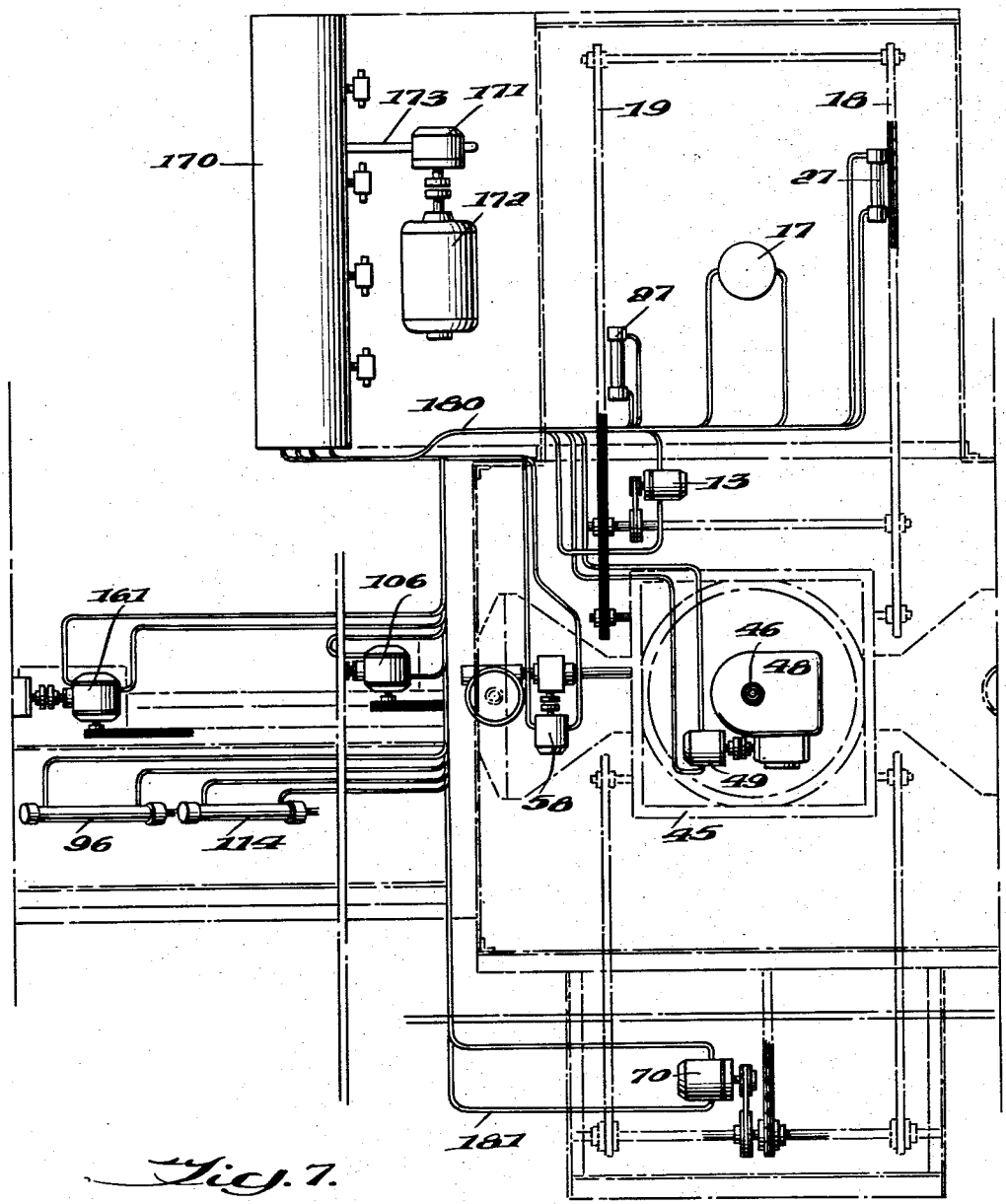
FIG. 7 is a diagrammatic illustration of a power system for operating the palletizer superimposed on the plan shown in greater detail by FIG. 3.

A hydraulic power system adapted for either manual or automatic control is illustrated diagrammatically in FIG. 7 of the drawings wherein the same reference numerals indicate the motors, power cylinders, and other equipment shown in other figures and previously described. This power system includes a hydraulic fluid reservoir 170, a pump 171 that is preferably driven by a 3-phase 440-volt electric motor 172, a pipe 173 connecting the reservoir with inlet of the pump, and a high pressure storage tank that is connected with the pump outlet and is not shown on the drawing.

A series of fluid lines indicated generally by reference numeral 180 connects the pressure storage tank with each of the prime movers indicated on the drawing, and each of these lines contains a valve controlling the flow of the fluid therein. A second series of return fluid lines connects the fluid outlets of the prime movers with reservoir 170.

The valves in fluid lines 180 are preferably solenoid-operated. The electric circuits controlling these solenoids may be brought together on a single control board so that the entire machine can be operated by manually opening and closing electric switches in the proper sequence. Preferably, however, the switches are so located and designed that they are operated by the packages or the unloaded or loaded pallets as they are transported by the moving parts of the machine, or by the moving parts themselves. The following sequence is illustrative.

It is assumed that empty pallet 26 has been placed on conveyor chains 18 and 19 by operation of the power cylinders 17 and 27 as was shown in describing FIG. 8 of the drawings. The valve in the fluid line leading to motor 13 is next opened until the pallet has moved to its position on turntable 45, whereupon it is closed, and the opening and closing may be done by switches contacted by the pallet. The second of these switches may also open the fluid line leading to motor 58 which raises the turntable to its extreme upper position just below the level of the carriage 90 in FIG. 2.

A filled bag or other package is then placed on the bag gate conveyor 85 where it contacts a switch that starts motor 161 and 106. These drive conveyors 85 and 86 and thereby move the bag forward to the reciprocating conveyor 90 where it advances by gravity on the belt 121 until it is stopped by roller 136. A contact switch at this point preferably stops motors 161 and 106 and advances the piston in power cylinder 114, thus moving conveyor 90 forwardly. At the end of its travel another switch reverses the flow fluid in cylinder 114, thus withdrawing the conveyor and depositing the bag in position on the pallet 26.

The indexing unit 48, which controls the angular position of the pallet with respect to the conveyor carriage 90, preferably operates in response to a rotating cam limit switch that is preferably geared to drive shaft 56 and causes the lift table 39 and pallet support 45 to move downwardly after each full rotation of the shaft 46. The same limit switch may also actuate the power cylinder 96 to shift the pattern of the next tier of bags on the pallet. Adjustable cams in such a switch permit regulation of the vertical movement so that it equals the thickness of the packages being loaded.

When the pallet support reaches its lowermost position, as shown in FIG. 2 of the drawings, the limit switch can also cause a solenoid to open the valve in fluid line 181 leading to motor 70, thus moving the loaded pallet to discharge station 79. A pallet-actuated switch at this station may be set to stop the motor 70 and simultaneously actuate power cylinders 27 to deposit another empty pallet on the conveyor chains 18 and 19, thus beginning another loading cycle.

From the foregoing description of a preferred embodiment it will thus be seen that all of the objects of the invention are accomplished. It will be understood, however, that while this embodiment may include many of the patentable features thereof, the invention in its broader aspects is not limited thereto and that modifications and substitutions of equivalents may be resorted to within the scope of the following claims.

I claim:

1. In a palletizing machine a loader for placing packages on a pallet comprising a movable carriage having a pair of longitudinally extending side pieces, a belt on pulleys journalled in said side pieces adapted to carry a package on its upper surface, a roller extending across the outer end of said belt and having its ends supported in toggles mounted on said side pieces, means for reciprocating said carriage to and away from a selected area of a pallet being loaded, means for holding said roller in the path of said package during the motion of the carriage toward said area, means responsive to movement of the carriage away from said area for removing said roller from the path of the package and means for moving the upper surface of said belt in the opposite direction and so discharging the package on said pallet.

2. In a palletizing machine having a package-placing carriage reciprocating over a relatively stationary support, a package positioner comprising a pair of toggles pivotally mounted on opposite sides of the outer end of said carriage, a roller extending across said carriage and having its ends pivotally supported in said toggles, spring means attached to said toggles and adapted normally to hold said roller in a position across the path of a package on said carriage, and means including a cam carried by said stationary support in the path of a projection on one of said toggles for raising said roller out of the path of said package.

3. In a palletizing machine a package delivery system comprising an accelerating conveyor including a pair of longitudinally extending side pieces and a motor-driven conveyor belt supported on rollers therein, a reciprocating conveyor having longitudinally extending side pieces below and adjacent to those of the accelerating conveyor, a set of rollers rotatably mounted therein including a driving pulley at the rear thereof and a belt on said rollers adapted to carry a package on its upper surface, means for reciprocating said last-named conveyor outwardly to and inwardly away from a selected area of a pallet being loaded, and means including a pinion gear attached to said driving pulley through an overrunning clutch and a rack mounted on one of the side pieces of the accelerating conveyor for permitting said belt to coast during the outward movement of the conveyor but driving its upper surface outwardly as the conveyor moves inwardly and thereby holding the package relatively motionless over said area as the conveyor is withdrawn therefrom.

4. In a palletizing machine, a pattern-shifting loader for forming interlocking tiers of packages on a pallet which comprises a carriage mounted for longitudinal movement on a supporting frame, a package placer on said carriage, means for reciprocating said carriage over said frame and thereby moving said package placer to and away from a selected zone of an adjacent pallet, means for discharging a package from said package placer to said selected zone, and means for moving said frame longitudinally and thereby causing the reciprocation of the carriage to bring the package placer to a different zone of said pallet.

5. In a palletizing machine, a pattern-shifting loader for forming interlocking tiers of packages on a pallet which comprises a pallet turntable, an adjacent base structure carrying a longitudinally movable frame, a carriage mounted for longitudinal movement on said frame, a package placer on said carriage, means for reciprocating said carriage over said frame and thereby moving said package placer to and away from a selected zone of a pallet on said turntable, means for discharging a package from said package placer to said selected zone, and means for moving said frame on said base structure and thereby causing the reciprocation of the carriage to bring the package placer to a different zone of said pallet.

6. In a palletizing machine, a pattern shifting loader for forming interlocking tiers of packages on a pallet which comprises a pallet turntable, an adjacent base structure carrying a longitudinally movable frame, a carriage mounted for longitudinal movement on said frame, a package placer on said carriage, means for reciprocating said carriage over said frame and thereby moving said package placer to and away from a selected zone of a pallet on said turntable, means for discharging a package from said package placer to said selected zone, and a power cylinder and piston between said base structure and said frame for moving the frame and thereby causing the reciprocation of the carriage to bring the package placer to different zone of said pallet.

7. In a palletizing machine, a pattern-shifting loader for forming interlocking tiers of packages on a pallet which comprises a pallet turntable, an adjacent base structure carrying a longitudinally movable frame, a carriage mounted for longitudinal movement on said frame and extending outwardly therefrom toward said turntable, means for reciprocating said carriage over said frame toward and away from a selected zone of a pallet on said turntable, a set of rollers journalled in said carriage, a belt on said rollers adapted to carry a package on its upper surface, means for moving the upper surface of said belt toward said zone as the carriage moves away from it and thereby causing a package thereon to be deposited on said zone, and means for moving said frame on said base structure and thereby causing the carriage and belt to reciprocate to a different zone of said pallet.

8. In a pallet loading machine, in combination, a pallet handling unit including means for advancing a pallet to a pallet elevating section, pallet positioning means in said section for elevating said pallet to a loading station, for adjusting it in said station both vertically and angularly with respect to a package placer therein and for delivering it after loading to a pallet discharge station, and a pattern-shifting loader for forming interlocking courses of packages on said pallet comprising a carriage mounted for longitudinal movement on a supporting frame, a package placer on said carriage, means for reciprocating said carriage over said frame and thereby causing the package placer to deposit packages in a selected zone of the pallet, and means for moving said frame longitudinally and thereby causing the reciprocation of the carriage to bring the package placer to a different zone of the pallet.

9. In a pallet loading machine, in combination, a pallet handling unit including means for advancing a pallet to a pallet elevating section, pallet positioning means in said section for elevating said pallet to a loading station, for adjusting it in said loading station both vertically and angularly with respect to a package placer therein and for delivering it after loading to a pallet discharge station, and a pattern-shifting loader for forming interlocking tiers of packages on said pallet comprising a base structure adjacent said loading station carrying a longitudinally movable frame, a carriage mounted for longitudinal movement on said frame and extending outwardly therefrom toward said loading station, means for reciprocating said carriage over said frame toward and away from a selected zone of said pallet, a set of rollers journalled in said carriage, a package-carrying belt on said rollers, means for moving the package-carrying portion of said belt toward said zone as the carriage moves away from said zone, and means for moving said frame on said base structure and thereby causing the carriage and belt to reciprocate to a different zone of said pallet.

10. In a palletizing machine a loader for placing packages on a pallet comprising a movable carriage inclined downwardly toward its outer end and having a package-carrying belt supported thereon and movable with respect thereto, a package stop at the outer end of said belt in the path of a package thereon and serving to halt the outward motion thereof, a power cylinder and piston attached to said carriage for reciprocating it outwardly to and inwardly away from a selected area of a pallet being loaded, means for moving the package-carrying portion of said belt outwardly as the carriage moves inwardly, and means responsive to the inward movement of the carriage for displacing said package stop and thereby permitting discharge of the package onto the pallet by the outward movement of the belt.

References Cited in the file of this patent

UNITED STATES PATENTS

| | | |
|---|---|---|
| 1,049,435 | Wood | Jan. 7, 1913 |
| 1,203,878 | Huson | Nov. 7, 1916 |
| 1,414,998 | Allen | May 2, 1922 |
| 1,464,513 | Sutherland | Aug. 14, 1923 |
| 1,570,484 | Hanson | Jan. 19, 1926 |
| 1,632,204 | Threefoot | June 14, 1927 |
| 1,923,836 | Mierre | Aug. 22, 1933 |
| 2,211,840 | Stacey | Aug. 20, 1940 |
| 2,323,174 | Wikle | June 29, 1943 |
| 2,675,928 | Slater | Apr. 20, 1954 |
| 2,946,465 | Raynor | July 26, 1960 |

UNITED STATES PATENT OFFICE
CERTIFICATE OF CORRECTION

Patent No. 3,143,222                      August 4, 1964

William T. Caskie

It is hereby certified that error appears in the above numbered patent requiring correction and that the said Letters Patent should read as corrected below.

Column 5, line 28, for "raeched" read -- reached --; column 6, line 14, after "the" insert -- bag --; line 25, for "not" read -- most --; line 71, for "motor" read -- motors --.

Signed and sealed this 5th day of January 1965.

(SEAL)
Attest:

ERNEST W. SWIDER
Attesting Officer

EDWARD J. BRENNER
Commissioner of Patents